US007076797B2

(12) United States Patent
Loveland (10) Patent No.: US 7,076,797 B2
(45) Date of Patent: Jul. 11, 2006

(54) GRANULAR AUTHORIZATION FOR NETWORK USER SESSIONS

(75) Inventor: Shawn Domenic Loveland, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 742 days.

(21) Appl. No.: 09/972,512

(22) Filed: Oct. 5, 2001

(65) Prior Publication Data

US 2003/0070091 A1   Apr. 10, 2003

(51) Int. Cl.
*H04L 9/32* (2006.01)
*H04L 9/00* (2006.01)

(52) U.S. Cl. .............................. 726/4; 726/28; 726/29; 726/10; 726/5

(58) Field of Classification Search ................ 713/201; 726/3, 4
See application file for complete search history.

(56) References Cited

U.S. PATENT DOCUMENTS

| | | | | |
|---|---|---|---|---|
| 4,601,011 A | * | 7/1986 | Grynberg ..................... 713/184 |
| 5,237,612 A | * | 8/1993 | Raith ........................... 380/247 |
| 5,280,527 A | * | 1/1994 | Gullman et al. ............ 713/184 |
| 5,524,072 A | * | 6/1996 | Labaton et al. ................ 705/72 |
| 5,570,295 A | * | 10/1996 | Isenberg et al. ......... 379/90.01 |
| 5,668,876 A | * | 9/1997 | Falk et al. ................... 380/271 |
| 5,719,560 A | * | 2/1998 | Watkins ........................ 340/5.5 |
| 5,805,674 A | * | 9/1998 | Anderson, Jr. ............ 379/93.03 |
| 5,826,014 A | * | 10/1998 | Coley et al. ................. 713/201 |
| 5,854,976 A | * | 12/1998 | Garcia Aguilera et al. . 455/411 |
| 5,898,830 A | * | 4/1999 | Wesinger et al. ............. 726/15 |
| 5,901,359 A | * | 5/1999 | Malmstrom ................. 455/461 |
| 5,940,591 A | * | 8/1999 | Boyle et al. .................... 726/3 |
| 5,991,292 A | * | 11/1999 | Focsaneanu et al. ........ 370/352 |
| 6,035,406 A | * | 3/2000 | Moussa et al. ................ 726/18 |
| 6,038,666 A | * | 3/2000 | Hsu et al. .................... 713/186 |
| 6,055,637 A | * | 4/2000 | Hudson et al. ............. 713/201 |
| 6,061,798 A | * | 5/2000 | Coley et al. ................. 713/201 |
| 6,067,623 A | * | 5/2000 | Blakley et al. ................. 726/5 |
| 6,079,020 A | * | 6/2000 | Liu .............................. 726/15 |
| 6,104,928 A | * | 8/2000 | Waugh ........................ 455/445 |

(Continued)

FOREIGN PATENT DOCUMENTS

DE       195 42 732        5/1997

(Continued)

OTHER PUBLICATIONS

Internet-DBMS Strategies, S. McKie, DBMS, Publ. by Miller Freeman, USA, vol. 9, No. 11,Oct. 1996, pp. 44-45, 50, 52.

*Primary Examiner*—Christopher Revak
*Assistant Examiner*—David Garcia Cervetti
(74) *Attorney, Agent, or Firm*—Workman Nydegger (57) ABSTRACT

Providing access to a mobile user session in a manner that more closely corresponds access to network resources to the trustworthiness of authentication methods and devices associated with the mobile user session. Characteristics of authentication methods associated with a mobile user session are synthesized to generate an authentication bundle. Characteristics may include data associated with passwords, biometric data or devices used to execute an authentication method. By synthesizing characteristics in varied manners, a non-binary sliding scale of access to network resources may be generated. An authentication bundle may be accessed to grant a mobile user session appropriate access to network resources. Granting access may include generating an authorization token that is passed to a filter or reverse proxy. Access to network resources may be dynamically modified as authentication methods associated with a mobile user session change.

47 Claims, 3 Drawing Sheets

U.S. PATENT DOCUMENTS

| | | | |
|---|---|---|---|
| 6,105,132 A * | 8/2000 | Fritch et al. | 713/167 |
| 6,108,583 A * | 8/2000 | Schneck et al. | 700/9 |
| 6,161,182 A * | 12/2000 | Nadooshan | 713/172 |
| 6,173,399 B1 * | 1/2001 | Gilbrech | 713/153 |
| 6,178,511 B1 * | 1/2001 | Cohen et al. | 713/201 |
| 6,201,871 B1 * | 3/2001 | Bostley et al. | 380/249 |
| 6,219,793 B1 * | 4/2001 | Li et al. | 713/202 |
| 6,226,748 B1 * | 5/2001 | Bots et al. | 726/15 |
| 6,226,751 B1 * | 5/2001 | Arrow et al. | 713/201 |
| 6,249,867 B1 * | 6/2001 | Patel | 713/167 |
| 6,256,737 B1 * | 7/2001 | Bianco et al. | 713/186 |
| 6,307,956 B1 * | 10/2001 | Black | 382/124 |
| 6,308,062 B1 * | 10/2001 | Chien et al. | 455/420 |
| 6,363,411 B1 * | 3/2002 | Dugan et al. | 709/202 |
| 6,442,696 B1 * | 8/2002 | Wray et al. | 713/201 |
| 6,477,373 B1 * | 11/2002 | Rappaport et al. | 455/436 |
| 6,505,300 B1 * | 1/2003 | Chan et al. | 713/164 |
| 6,510,153 B1 * | 1/2003 | Inoue et al. | 370/354 |
| 6,510,349 B1 * | 1/2003 | Schneck et al. | 700/9 |
| 6,510,523 B1 * | 1/2003 | Perlman et al. | 713/201 |
| 6,526,513 B1 * | 2/2003 | Shrader et al. | 726/4 |
| 6,539,101 B1 * | 3/2003 | Black | 382/124 |
| 6,550,012 B1 * | 4/2003 | Villa et al. | 726/11 |
| 6,580,718 B1 * | 6/2003 | Chapman | 370/409 |
| 6,594,484 B1 * | 7/2003 | Hitchings, Jr. | 455/414.1 |
| 6,609,198 B1 * | 8/2003 | Wood et al. | 713/155 |
| 6,610,105 B1 * | 8/2003 | Martin et al. | 715/513 |
| 6,654,459 B1 * | 11/2003 | Bala et al. | 379/265.04 |
| 6,662,005 B1 * | 12/2003 | Palvianen | 455/414.1 |
| 6,668,322 B1 * | 12/2003 | Wood et al. | 713/182 |
| 6,691,232 B1 * | 2/2004 | Wood et al. | 713/201 |
| 6,701,437 B1 * | 3/2004 | Hoke et al. | 726/15 |
| 6,732,278 B1 * | 5/2004 | Baird et al. | 713/201 |
| 6,741,853 B1 * | 5/2004 | Jiang et al. | 455/418 |
| 6,742,022 B1 * | 5/2004 | King et al. | 709/219 |
| 6,751,562 B1 * | 6/2004 | Blackett et al. | 702/61 |
| 6,751,677 B1 * | 6/2004 | Ilnicki et al. | 719/316 |
| 6,751,734 B1 * | 6/2004 | Uchida | 713/186 |
| 6,751,738 B1 * | 6/2004 | Wesinger et al. | 726/14 |
| 6,754,831 B1 * | 6/2004 | Brownell | 726/15 |
| 6,769,068 B1 * | 7/2004 | Brozowski et al. | 726/5 |
| 6,775,298 B1 * | 8/2004 | Aggarwal | 370/473 |
| 6,775,687 B1 * | 8/2004 | Binding et al. | 709/203 |
| 6,799,272 B1 * | 9/2004 | Urata | 713/171 |
| 6,804,783 B1 * | 10/2004 | Wesinger et al. | 726/11 |
| 6,819,219 B1 * | 11/2004 | Bolle et al. | 340/5.52 |
| 6,854,060 B1 * | 2/2005 | Kilkkila | 713/176 |
| 6,859,879 B1 * | 2/2005 | Henn et al. | 726/1 |
| 6,892,307 B1 * | 5/2005 | Wood et al. | 713/201 |
| 2002/0007460 A1 * | 1/2002 | Azuma | 713/201 |
| 2002/0044552 A1 * | 4/2002 | Vialen et al. | 370/389 |
| 2002/0052965 A1 * | 5/2002 | Dowling | 709/230 |
| 2002/0144119 A1 * | 10/2002 | Benantar | 713/171 |
| 2002/0184527 A1 * | 12/2002 | Chun et al. | 713/201 |
| 2002/0194508 A1 * | 12/2002 | Sanchez et al. | 713/202 |
| 2003/0005297 A1 * | 1/2003 | Fichtner et al. | 713/168 |
| 2003/0033524 A1 * | 2/2003 | Tran et al. | 713/168 |
| 2003/0074580 A1 * | 4/2003 | Knouse et al. | 713/201 |
| 2003/0090998 A1 * | 5/2003 | Lee et al. | 370/229 |
| 2003/0125028 A1 * | 7/2003 | Reynolds | 455/437 |
| 2003/0186680 A1 * | 10/2003 | Bhasin et al. | 455/411 |
| 2003/0228868 A1 * | 12/2003 | Turanyi et al. | 455/432.1 |
| 2004/0266457 A1 * | 12/2004 | Dupray | 455/456.5 |

FOREIGN PATENT DOCUMENTS

| | | |
|---|---|---|
| WO | WO 01/11845 | 2/2001 |
| WO | WO 01/99334 | 12/2001 |

* cited by examiner

GRANULAR AUTHORIZATION FOR NETWORK USER SESSIONS

BACKGROUND OF THE INVENTION

1. The Field of the Invention

The present invention relates to network security. More specifically, the present invention relates to systems, methods, and computer program products for granting and dynamically modifying access to network resources where access may correspond to the trustworthiness of authentication methods and devices associated with a user session.

2. Background and Relevant Art

Today it is very difficult, if not impossible, for network administrators to give mobile users appropriate access to network resources. Conventional methods for granting access to network resources are binary for the most part. That is, either a user is "logged on," and may access network resources or the user is "logged off," and cannot access network resources. This binary approach is followed even though the use of different devices and different authentication methods results in different levels of trustworthiness.

For example, by entering a dual tone multi-frequency ("DTMF") personal identification number ("PIN") from a pay phone, a user may be granted the same access to network resources as compared to entering a password at a computer directly coupled to a corporate intranet. Entering a password from a computer directly coupled to a corporate intranet may be considered more secure than entering a DTMF PIN from a pay phone. Yet both authentication methods may result in the same access to network resources. Binary approaches are often problematic for mobile user sessions due to the wide variety of devices and corresponding authentication methods used in a mobile environment.

In some cases, network managers may implement secondary domains, secondary user accounts, and various other means to try to give appropriate access to mobile users. For example, a user may have a local user account and a mobile user account. The local user account may be configured to operate only on trusted computing devices. This allows different access rights to be assigned to users depending on their location. Thus, a local user account may be given more access to network resources than a mobile user account. However, this is still a binary approach, as any conventional access method would grant the mobile user account the same access to network resources. For example, a mobile user calling from a pay phone that logs on using a DTMF PIN and a mobile user calling from a secure mobile phone, who speaks a complex challenge response password may both receive the same access to network resources. In other words, when a mobile user account is granted access to network resources, no consideration is given to the trustworthiness of authentication methods or devices. Furthermore, this method requires additional effort to establish and maintain the mobile user account.

Another approach is to assign certain mobile access methods as trustworthy. For example, a network may be configured to allow mobile access from a secure caller line ID or for users who are voiceprinted. However, this approach also results in binary access to network resources and does not consider the trustworthiness of methods or devices associated with the mobile user session. For example, a mobile user voiceprinted from a public telephone or a secure mobile phone may receive the same access, while a mobile user requesting access via any non-trusted access method is completely denied access to network resources. This approach is often ineffective due to environmental factors as well. For example, a user may roam out of their local calling area and the secure nature of a mobile phone cannot be verified or a user may have a cold and not be able to use voiceprint. In these cases, trustworthiness of methods and devices requesting access may still be relatively high but access to network resources is denied.

Considering the trustworthiness of devices associated with a user session is especially important when some access methods are predetermined as being secure. During a request for access to network resources, a mobile user may present a user ID and a password. In some cases, DTMF tones may facilitate entry of these credentials. Conventional authentication methods may grant the same access to network resources whether these credentials are entered from a public pay phone or from a secure mobile phone. This may not grant appropriate access, as a secure mobile phone may be considered more trustworthy than a public pay phone.

Therefore, what is desired are systems, methods, and computer program products for granting or dynamically modifying access to network resources in a manner that may correspond access to the trustworthiness of authentication methods and devices associated with a user session.

BRIEF SUMMARY OF THE INVENTION

The principles of the present invention provide for granting and dynamically modifying a user session's access to network resources, where access may correspond to the trustworthiness of authentication methods and devices associated with the user session. Characteristics associated with authentication methods are synthesized to create an authentication bundle that may include information representative of access to network resources. A security module may receive the authentication bundle and a user session may be granted access to the representative network resources based on the authentication bundle.

A user session may attempt to authenticate to a network using one or more authentication methods. When authentication is attempted, characteristics representative of authentication methods may be detected. Such characteristics may include a type of device associated with the authentication attempt, for example, a telephone, a computer, a mobile telephone, a personal digital assistant, or a hand-held computer. Characteristics associated with an authentication method may also include a type of authentication such as, password or biometric authentication. Such characteristics may also include how a type of authentication was entered, for example, by using keys of a telephone keypad, keys of a conventional keyboard, spoken phrases, or fingerprints. Other characteristics may also be detected, such as whether a device is a known device and whether a device is a secure device.

The characteristics may then be synthesized to facilitate generation of an authentication bundle representative of an appropriate extent of access to network resources. Synthesizing may include consideration of different characteristics of authentication methods associated with a user session. Different combinations of characteristics may result in different access to network resources or the same access to network resources. For example, entering a DTMF PIN from a payphone may result in less access to network resources than being voiceprinted. However, entering a DTMF PIN from a secure mobile phone may perhaps result in the same access to network resources as being voiceprinted. The amount of access to network resources granted to different authentication methods may be predefined. For example, a corporate information technology department may wish to manage authentication methods by assigning different levels of access to different authentication methods.

A module may access an authentication bundle to facilitate granting a user session an appropriate extent of access to network resources. The extent of access granted depends on the representative information included in the authentication bundle. In one example, the module grants access by generating an authorization token identifying an extent of access to network resources. Thus, any given user may be granted a variety of different access permissions depending on how the user authenticated and from what device. Accordingly, for example, a user that authenticates from a less secure device via a less secure authentication method would typically be granted less access to network resources than if the user authenticated using a more secure authentication method from a more secure device.

The module may also consider whether an established user session has, during the course of the user session, implemented any additional authentication methods and/or transitioned to a more secure device. Thus, the module may dynamically grant additional access rights to a user session as circumstances warrant. Conversely, if for some reason during a user session, a previously successful authentication method were to fail, or perhaps the user were to transition to a less secure device, the module may dynamically revoke existing access rights from a user session. Granting and revoking access may be facilitated by a reverse proxy or filter associated with the user session. When access rights are granted or revoked, a user associated with a user session may be so notified.

By considering characteristics of authentication methods, a user session may be granted appropriate access to network resources in a non-binary manner. That is, there is a sliding scale from which access to network resources may be given. Based on representative characteristics of authentication methods and devices available at a given moment, access to network resources may change. Thus, a user session may be granted access that more closely corresponds to the trustworthiness of authentication methods and devices associated with the user session.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products for granting and dynamically modifying access to network resources where access may correspond to the trustworthiness of authentication methods and devices associated with a user session. A device may be engaged in a user session in which one or more authentication methods have been used. Characteristics of the authentication methods and devices may be accessed to create an authentication bundle that includes information representative of access to network resources. As authentication methods associated with a user session change, a user session's access to network resources may be correspondingly modified.

During operation, characteristics of authentication methods and devices associated with a user session may be accessed. The accessed characteristics may be synthesized to generate an authentication bundle. Since the authentication bundle is generated from characteristics of authentication methods and devices, the authentication bundle may include data representative of an appropriate extent of access to network resources. This representative data may be based on the trustworthiness of the authentication methods and devices. An access granting module may access the authentication bundle and cause a user session to be granted the appropriate extent of access to the network resources represented in the authentication bundle.

The embodiments of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media may be any available media, which is accessible by a general purpose or special purpose computer. By way of example, and not limitation, such computer-readable media can comprise physical storage media such as RAM, ROM, EPROM, CD-ROM or other optical disk storage, magnetic disk storage or other magnetic storage devices, or any other medium which can be used to carry or store desired program code means in the form of computer-executable instructions or data structures and which may be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, special-purpose computer, or special-purpose processing device to perform a certain function or group of functions.

Figure 1A:
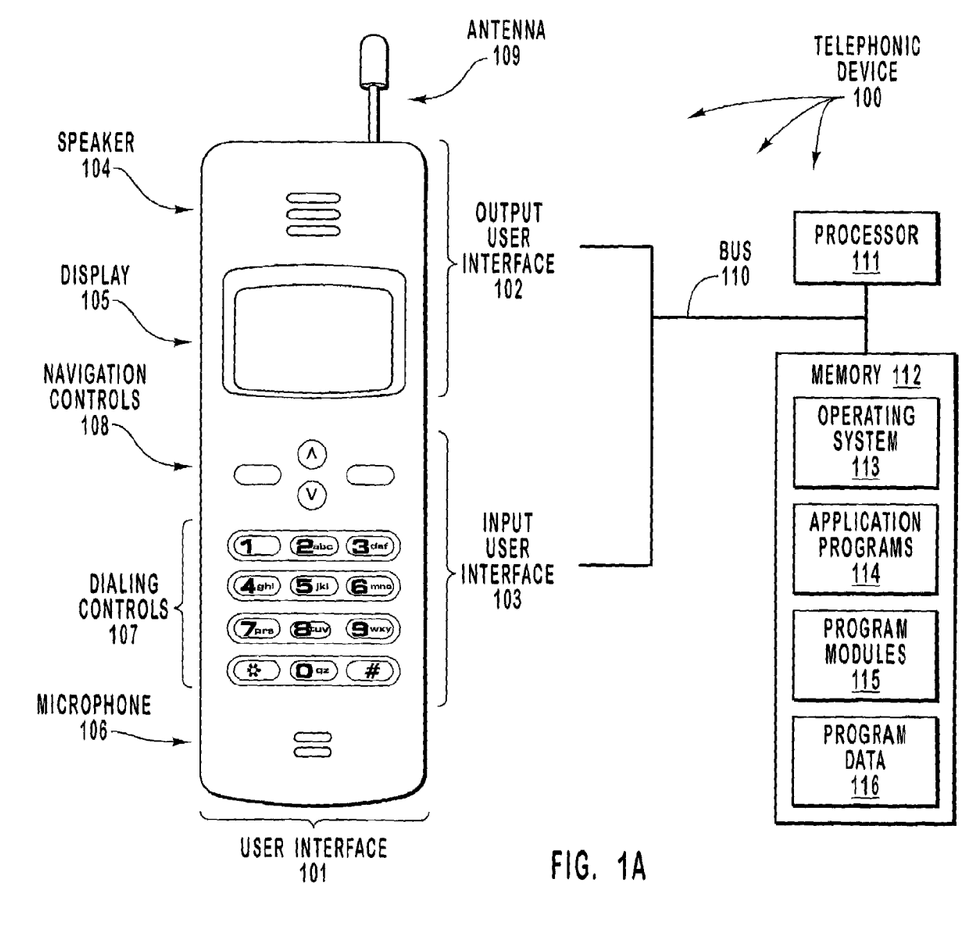
FIG. 1A illustrates an example mobile computing device that provides a suitable operating environment for the present invention.
Figure 1B:
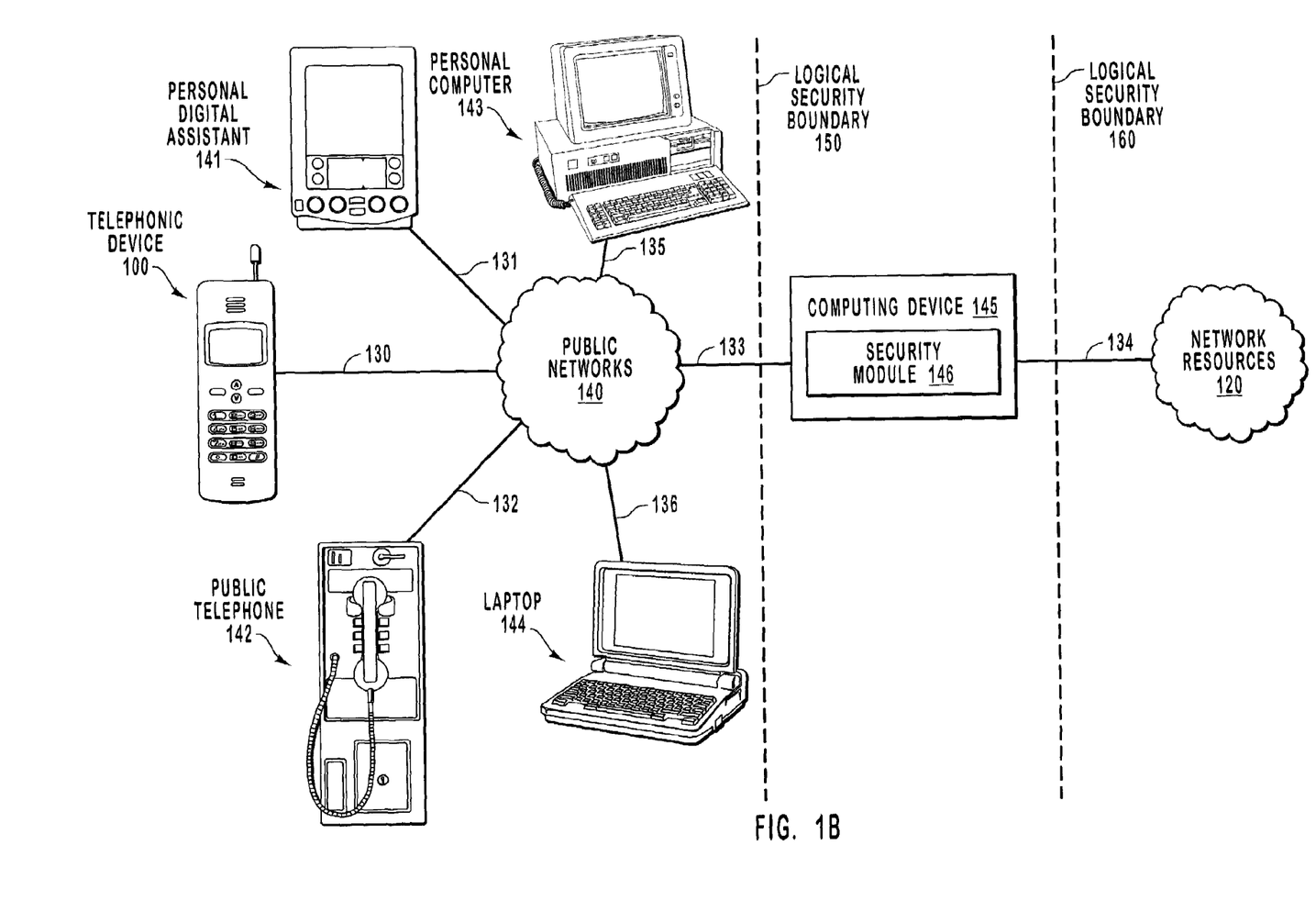
FIG. 1B illustrates an example network environment that provides a suitable operating environment for the present invention.

Embodiments of the present invention may also operate in a networked environment using logical communication links, such as logical communication link 130 illustrated in FIG. 1B, to one or more other computing devices. Computing devices may be a personal computer, a mobile phone, a personal digital assistant ("PDA"), a server, a router, a network PC, a peer device or other common network node. These computing devices may typically include a processing unit, a system memory, a system bus that couples various system components including the processing unit to the system memory, and any of the physical storage media discussed above. The system bus may be any of several types of bus structures including a memory bus or a memory controller, a peripheral bus, and a local bus using any of a variety of bus architectures. The system memory may include read only memory (ROM) and random access memory (RAM). A basic input/output system (BIOS), containing the basic routines that help transfer information between elements within the computing device, such as during start-up, may be stored in ROM.

The logical communication links depicted in FIG. 1B may include portions of a local area network ("LAN") and/or a wide area network ("WAN") that are presented here by way of example but not limitation. Such networking environments are commonplace in office-wide or enterprise-wide computer networks, such as intranets and the Internet. When used in a LAN networking environment, a computing device may be connected to a local network through a network interface or adapter.

When used in a WAN networking environment a computing device may include a modem, a wireless link, or other means for establishing communications over a wide area network, such as the Internet. The modem, which may be internal or external, may be connected to a system bus via a serial port interface. In a networked environment, program modules or portions thereof, may be stored in a remote memory storage device. It will be appreciated that the network connections shown in FIG. 1B are exemplary and other means of establishing communications over a LAN or WAN may be used.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computing devices, which are linked (either by hardwired links, wireless links, or by a combination of hardwired or wireless links) through a communication network, both perform tasks. In a distributed computing environment, program modules may be located in both local and remote memory storage devices.

FIG. 1A and the following discussion are intended to provide a brief, general description of a suitable computing environment in which the invention may be implemented. Although not required, the invention will be described in the general context of computer-executable instructions, such as program modules, being executed by computing devices. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1A, a suitable operating environment for the principles of the invention includes a general-purpose computing device in the form of a telephonic device 100. The telephonic device 100 includes a user interface 101 for allowing a user to input information through an input user interface 103, and review information presented via an output user interface 102. For example, the output user interface 102 includes a speaker 104 for presenting audio information to the user, as well as a display 105 for presenting visual information to the user. The telephonic device 100 may also have an antenna 109 if the telephonic device 100 has wireless capabilities.

The input user interface 103 may include a microphone 106 for rendering audio information into electronic form. In addition, the input user interface 103 includes dialing controls 107 represented by 12 buttons through which a user may enter information. Input user interface 103 also includes navigation control buttons 108 that assist the user in navigating through various entries and options listed on display 105.

Although the user interface 101 has the appearance of a mobile telephone, the unseen features of the user interface 101 may allow for complex and flexible general-purpose processing capabilities. For example, the telephonic device 100 also includes a processor 111 and a memory 112 that are connected to each other and to the user interface 101 via a bus 110. The memory 112 generally represents a wide variety of volatile and/or non-volatile memories and may include types of memory previously discussed. However, the particular type of memory used in the telephonic device 100 is not important to the present invention.

Although a telephonic device is illustrated in FIG. 1A, embodiments of the present invention may also be practiced with a personal computer. A personal computer may include any of the components discussed with respect to telephonic device 100. A personal computer may also be associated with an input user interface in the form of a keyboard and/or mouse and an output user interface in the form of a display device. A personal computer may be coupled to associated network systems via wireless technologies, hardwired technologies, or combinations thereof.

Program code means comprising one or more program modules may be stored in memory 112. The one or more program modules may include an operating system 113, one or more application programs 114, other program modules 115, and program data 116.

While FIG. 1A represents a suitable operating environment for the present invention, the principles of the present invention may be employed in any device that is capable, with suitable modification if necessary, of implementing the principles of the present invention. The environment illustrated in FIG. 1A is illustrative only and by no means represents even a small portion of the wide variety of environments in which the principles of the present invention may be implemented.

In this description and in the following claims, a "user session" is defined as a continued communication relationship between two devices, which may involve the exchange of data between the two devices. This may include a lasting connection between two devices where resources are continually allocated to maintain the connection or a connectionless relationship where resources are not continually allocated to maintain a connection. An example of a connectionless relationship may be a Short Message Service ("SMS") environment where messages are sent to a mobile device at intervals.

In this description and in the following claims, a "mobile user session" is defined as a user session where at least one of the two devices included in a user session is a device external to the boundaries of a known network. For example, a mobile telephone attempting to access a corporate intranet via a public cellular telephone network. The type of device associated with a mobile user session may be a mobile computing device, such as telephonic device 100, a PDA, a pager, a hand-held device, a laptop computer, or other device typically associated with a mobile computing environment. However, a mobile user session may also include a session initiated from a non-mobile device such as a standard personal computer, telephone, or other device, if the origination of the user session is logically or physically outside the boundaries of a known network. For example, a public telephone attempting to access electronic mail included in a corporate intranet via a Public Switched Telephone Network ("PSTN"). In contrast, a mobile telephone, or similar device, may not be associated with a mobile user session if a user session originates internal to the boundaries of a known network. For example, a PDA linked directly to a corporate intranet via a wireless network adapter.

Telephonic device 100 may operate in a networked environment as shown in FIG. 1B. Illustrated in FIG. 1B are computing devices including telephonic device 100, PDA 141, personal computer 143, laptop 144, and public telephone 142. Also illustrated, are lines between these computing devices and other functional components included in the networked environment. These lines represent logical communication paths. Logical communication paths, such as logical communication paths 130, 131, 135, 136, and 132, may comprise a variety of network types, protocols, communication methods, or combinations thereof. For example, a logical communication path may include portions of a LAN or a WAN.

In this description, reference may be made to the computing devices illustrated in FIG. 1B. However, the present invention is not limited to the illustrated computing devices. It would be apparent to one skilled in the art, after having reviewed this description, that a wide variety computer system configurations, including those previously discussed, may be used to implement the principles of the present invention.

Logical communication paths may also include other program modules (not shown) that condition or format portions of data so as to make them accessible to the illustrated computing devices and functional components. It may also be that the physical communication medium associated with a logical communication path changes during operation, for example, when a computing device or functional component is included in a Virtual Private Network ("VPN"). In these embodiments, data packets may be transferred through the use of virtual connections that have no real physical presence. While data packets are delivered to the correct destination in sequence, the data packets may be routed through various machines in an ad hoc manner. That is, no physical lines are dedicated to the connection.

Logical communication paths may include portions of a cellular or digital network used by telephonic device 100 for voice communication. Logical communication paths may also include portions of telephone networks used by public telephone 142 for voice communication. Telephone networks used by public telephone 142 may include portions of a PSTN, as well as portions of more modern telephone networks based on digital technologies, such as Integrated Services Digital Network ("ISDN") and Fiber Distributed Data Interface ("FDDI").

Logical communication paths may also include portions of the Internet or other proprietary networks general accessible to the computing devices and functional components illustrate in FIG. 1B. Logical communication paths may also include combinations of any of the previously described networks.

Telephone device 100 may communicate with public networks 140 over logical communication path 130, which may be a wireless communication link. Public networks 140 may include the cellular or digital networks used by telephonic devices for voice communications, the Internet, Public Service Telephone Networks, modern telephone networks as previously described, other proprietary networks that are generally accessible to the computing devices in FIG. 1B, or any combination thereof.

Public networks 140 may be connected to computing device 145 via logical communication path 133. Computing device 145 is illustrated as separate from public networks 140 to aid in clarifying operation of the present invention. However, the present invention is not limited to this embodiment. It would be apparent to one skilled in the art, after having reviewed this description, that computing device 145 may be included in public networks 140, as well as other networks, when implementing the principles of the present invention.

Also illustrated in FIG. 1B is logical security boundary 150. Logical security boundary 150 is a logical representation of a boundary between public networks 140 and computing device 145. A boundary such as this may exist between a PSTN and a cellular or digital carrier network. It should be understood that logical security boundary 150 is merely a logical boundary. For example, in an embodiment including a VPN, communication may take place over any of the computing devices, functional components, or logical communication links in FIG. 1B, including those in public networks 140.

A physical representation of logical security boundary 150 may include devices or systems designed to prevent unauthorized access to computing device 145. This physical representation may include a firewall, a packet filter, an application gateway, a circuit level gateway, a proxy server, other mechanisms used to protect a private network, or any combinations thereof. Physical representations of logical security boundary 150 may be implemented in hardware, software, or combinations thereof.

Computing device 145 may be connected to network resources 120 via logical communication path 134. Similar to the above discussion, embodiments of the present invention may exist where computing device 145 is included in network resources 120. It may also be that portions of network resources 120 are included in public networks 140.

Also illustrated in FIG. 1B is logical security boundary 160. Logical security boundary 160 is a logical representation of a boundary between computing device 145 and network resources 120. A boundary such as this may exist between a cellular or digital carrier network and a corporate enterprise network. It should be understood that logical security boundary 160 is merely a logical boundary. For example, in an embodiment including a VPN, essentially secure communication may take place over any of the computing devices, functional components, or logical communication links in FIG. 1B, including those in public networks 140 and network resources 120. A physical representation of logical security boundary 160 may include any of the physical representations discussed in relation to logical security boundary 150.

Figure 2:
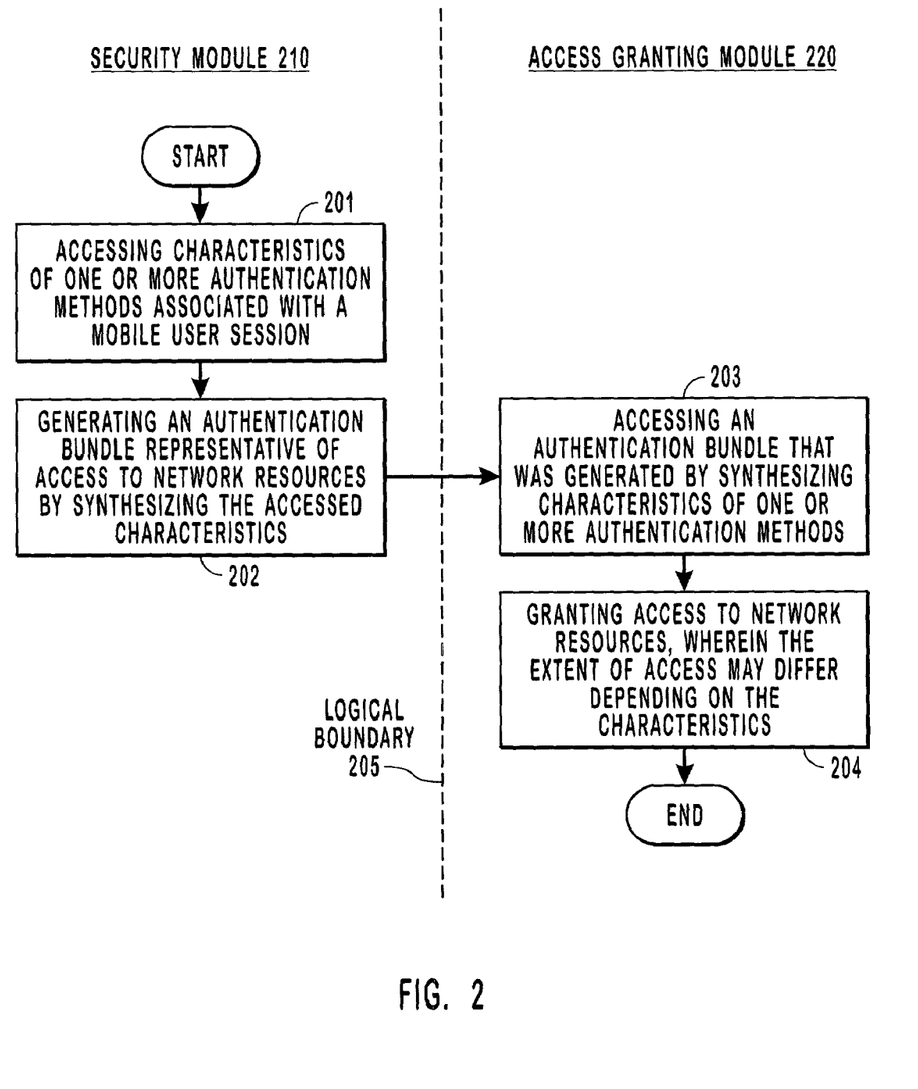
FIG. 2 is a flow diagram illustrating an example of a method for granting access to network resources.

Shown in FIG. 2 is a flow diagram illustrating a method for granting access to network resources. The method in FIG. 2 will be discussed with reference to the computing devices and functional components included in FIG. 1B.

Illustrated in FIG. 2 is security module 210 and access granting module 220 performing acts. Security module 210 and access granting module 220 are separated by logical boundary 205. Security module 210 may be similar to security module 146 shown in FIG. 1B. Access granting module 220 may be included in network resources 120. In one embodiment, security module 210 may be included as part of a digital or cellular carrier network and access granting module 220 may be included as part of a corporate enterprise network. In this embodiment, it may be that logical boundary 205 is similar to logical boundary 160. However, the present invention is not limited to the illustrated arrangement of computing devices and functional components. It would be apparent to one skilled in the art, after having reviewed this description, that a wide variety of different computing device and functional component arrangements, including those previously discussed, may be used to implement the principles of the present invention.

The method in FIG. 2 may include an act of accessing characteristics of one or more authentication methods associated with a mobile user session (act 201). In one embodiment, act 201 may be performed by security module 210 included in a digital carrier network. In another embodiment, computing device 145 may access characteristics of authentication methods used by telephonic device 100. These characteristics may be associated with a mobile user session requesting access to network resources 120. Characteristics of an authentication method may include a type of authentication method and a type of device associated with an authentication method.

Characteristics of authentication methods that may be accessed in act 201 include varied types of passwords, varied types of biometric data, device identification numbers, caller line identification data, and environmental data, such as the time of day.

Passwords include a series of characters that, when received, may enable a user session to access network resources. Passwords may be simple or complex and may be input in different manners. A simple password may not be restricted by any set of rules that define how a password may be constructed. On the other hand, a complex password may be associated with such rules. For example, a complex password may be required to be at least a certain number of characters in length, may be required to include both upper and lower case characters, or may be required to include characters from different categories, such as English letters, Arabic numerals, or non-alpha numeric characters. When a password includes solely numeric digits, such as Arabic numerals, the password may be termed a Personal Identification Number ("PIN").

Passwords may be input from a keyboard associated with a computing device, in which case depressing one or more keys on the keyboard generates the password. All portions of the password may then be sent simultaneously when a transmit key is depressed.

Passwords may also be input from a keypad associated with a telephonic device, such as dialing controls 107 or a keypad included in public telephone 142. Entering passwords from a keypad may be facilitated by the use of dual tone multi-frequency ("DTMF") techniques. DTMF assigns a specific frequency, or tone, to each key on a touchtone keypad so that a key may be easily identified by a microprocessor. When passwords are entered using DTMF, data is transmitted each time a key is pressed. Entering numeric digits via DTMF tones may be termed as entering a DTMF PIN.

A password or PIN may also include spoken phrases. For example, when attempting to access network resources 120 via a mobile user session, a user make speak phrases into microphone 106. These phrases may be transmitted to computing device 145 for verification. Spoken phrases may be input in response to a challenge issued from a module, such as security module 146.

In addition to recognizing that a phrase was spoken, some authentication methods may access physical characteristics of the speech, such as tone or pitch. A computer may analyze these physical characteristics to determine if a spoken phrase has physical characteristics similar to an existing "voiceprint." Voiceprinting is a type of biometric authentication technique. Biometric authentication techniques are often techniques relying on measurable physical data that may be automatically checked. The data associated with a biometric authentication technique may be termed biometric data. Examples of other biometric authentication techniques include computer analysis of fingerprints and retinal scans. It should be understood that these are only examples of biometric authorization techniques. It would be obvious to those skilled in the art, after having reviewed this description, that the principles of the present invention may be practiced with virtually any technique that uses measurable physical data to facilitate authentication.

In performing act 201, characteristics of unknown, known, or secure devices may be accessed. An unknown device may be a device that has not previously been used to access network resources. For example, if PDA 141 had never before attempted to access network resources 120, security module 146 may determine that PDA 141 is an unknown device. Computing device 145 may also include a list or database of known devices. If public telephone 142 attempted to access network resources 120 and was not included in the list, public telephone 142 may be designated as an unknown device. Conversely, if public telephone 142 was included in the list, it may be designated as a known device.

A list or database including known devices may be configured in a variety of formats. For example, a list may include computer network addresses associated with computing devices or may include physical device identifiers, such as those burned into secure mobile telephones. A list may also include telephone numbers, in which case devices attempting to access network resources may be identified by caller identification data. It should be understood that these are only examples of lists that may facilitate identification of a device. It would be obvious to those skilled in the art, after having reviewed this description, that the principles of the present invention may practiced with virtually any list that includes data used to facilitated identification of device.

Devices may be designated as secure if they are associated with some level of trustworthiness. The trustworthiness of a device may be determined based on the location of the device. For example, a telephone inside a corporate office may be deemed secure. On the other hand, a public telephone 142, even if it is a known device, may not be deemed secure due to its location in a public place.

In addition to the location of a device, a device may be deemed secure based on the device's characteristics. For example, some computing devices have identification numbers hard-coded into components. These identification numbers may be associated with a user session or may be characteristics of an authentication method used by the computing device. Since identification numbers are hard-coded there may be a level of trustworthiness associated with computing devices including such numbers. This level of trustworthiness may be enough to deem such a computing device as a secure device.

Other characteristics that may be considered when determining a secure device include versions of an operating system, versions of firmware, the type of device, or the system resources currently available. It should be understood that these are only examples of characteristics that may facilitate a determination on the trustworthiness of a device. It would be obvious to those skilled in the art, after having reviewed this description, that determining a device is a secure device may be performed by considering virtually any physical characteristics associated with a device.

Accessed characteristics may also include a device type of a specific configuration. For example, computing device 145 may be able to detect that a device attempting to authenticate is a telephone, a computer, a mobile telephone, etc. Combinations of device types may also occur. For example, a device might be designated as a secure PDA, a known public telephone, or an unknown mobile telephone.

Other characteristics of an authentication method may also be accessed. For example, environmental information, such as whether or not a mobile telephone is in a roaming configuration. Chronological information may also be accessed, such as, the time of day, day of week, or when a user associated with a user session last accessed network resources. For example, if a user attempts to access network resources from a known device that recently went through a rigorous authentication process, granting access to additional resources may require little if any additional authentication. However, an unknown device may require significant additional authentication to be granted access to the same resources.

If a device has multiple communication channels, the communication channel associated with an authentication may be accessed. For example, when a mobile phone or PDA transmits a PIN over an out of band communication channel.

The method may also include an act of generating an authentication bundle representative of an extent of access to network resources by synthesizing the accessed characteristics (act 202). Synthesizing characteristics may be termed as combining accessed characteristics so as to form a new, more complex, authentication bundle. An authentication bundle may include data representative of the extent of access a requesting user session may be given. For example, synthesizing accessed characteristics of a password, and/or of biometric data, and/or of a device may generate an authentication bundle. Synthesizing characteristics in different variations may result in different authentication bundles.

In one embodiment, security module 146 may accumulate accessed characteristics to facilitate generation of an authentication bundle. This may occur when security module 146 is generating an authentication bundle for a user session associated with telephonic device 100. Accessed characteristics may not arrive simultaneously at security module 146. For example, security module 146 may access characteristics of a device type associated with telephonic device 100 before accessing characteristics of a voiceprint associated with telephonic device 100.

Other characteristics may be synthesized when generating an authentication bundle, for example, amounts of available resources associated with a user session, such as memory, disk space, or bandwidth available to a user session. In some configurations, a device associated with a user session may not be well suited for access to network resources. A device may be low on memory or disk resources, a device may be in a roaming configuration that hampers reliable communication, or a data transmission rate may be below a predetermined threshold. It should be understood that these are only examples of characteristics that may be synthesized. It would be obvious to those skilled in the art, after having reviewed this description, that the principles of the present invention may be practiced with virtually any physical characteristics associated with a device.

Synthesizing accessed characteristics in varied combinations may create a sliding scale for assigning access to network resources based on the trustworthiness of devices and authentication methods. For example, a user session authenticating with a DTMF PIN from a secure mobile phone may be given more access to network resources 120 than a user session authentication with a DTMF PIN from public telephone 142.

The method in FIG. 2 may include accessing an authentication bundle that was generated by synthesizing characteristics of one or more authentication methods (act 203). As illustrated in FIG. 2, this may include transferring performance of the included acts from security module 210 to access granting module 220. This is illustrative of an embodiment where a digital or cellular carrier may pass an authentication bundle to a corporate enterprise network. In this embodiment, logical boundary 205 may perform security operations on data passed between security module 210 and access granting module 220.

This is only an example of how an authentication bundle may be accessed. It may be that security module 210 and access granting module 220 are included in the same network or device, such as computing device 145. It would be obvious to those skilled in the art, after having reviewed this description, that the principles of the present invention may be practiced when a module accesses an authentication bundle from virtually any location.

The method in FIG. 2 may include granting access to network resources wherein the extent of access may differ depending on the characteristics (act 204). Access granting module 220, which may be included in security module 146, may grant a user session access to the network resources represented in the authentication bundle. In one embodiment, receiving an authentication bundle may result in generation of an authorization token that is associated with a level of access to network resources. An authorization token may include data representative of the authentication methods employed by a user session.

In one embodiment, a user session may be granted less than a maximum level of access associated with a user. For example, a user may be associated with a level of access to network resources when authenticating from a connection included in a secure portion of a corporate intranet. However, when authenticating from a mobile phone, the user is not given the same level of access to network resources. This may be due to the reduced trustworthiness of using a mobile telephone or to the lack of secure authentication methods associated with the mobile phone. For example, perhaps the mobile phone is secure but voiceprinting is not supported.

In one embodiment, a module associated with logical security boundary 150 or logical security boundary 160, such as a firewall or other security mechanism previously described, may facilitate granting access to network resources. A filter or reverse proxy may be used to grant a user session less than a maximum level of access associated with a user. In these embodiments, an authentication bundle or authorization token may be passed to the filter or reverse proxy to facilitate granting this reduced access to a user session.

In one embodiment, access to network resources may be dynamically modified. During the course of a user session, authentication methods may become available or unavailable to the user session. This may be the result of environmental factors, the configuration of a device, or the physical condition of a user. For example, a mobile phone that initially authenticated by a DTMF PIN may later be prompted for a complex voice challenge when the user session attempts to access sensitive corporate data. Conversely, a user session initially authenticated using voiceprint may have access to network resources revoked, if the condition of a voice connection deteriorates during the session. In such cases, a new authentication bundle may be synthesized from accessed characteristics in existence at a certain time.

By granting access to network resources based on the trustworthiness of authentication methods and devices, a sliding scale of access may be utilized. User sessions may be granted different access to network resources when logging in from different locations using different authentication methods. As a result, a single user account may be used to facilitate appropriate access to network resources for a user in any location. Additionally, since access is dynamically adjustable there is an increased chance the user will always have an appropriate level of access to network resources.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The invention claimed is:

1. In a computing device including a security module that grants a user session access to network resources based on dynamic combinations of security characteristics associated with a user session, a method for granting dynamic mobile user session access to network resources depending on one or more authentication methods and the security of one or more devices associated with the mobile user session so as to grant dynamic access that corresponds to the trustworthiness of the associated authentication methods and devices, the method comprising:

an act of accessing one or more security characteristics of one or more authentication methods for a user device that is associated with the mobile user session, the one or more security characteristics accounting for security differences in different authentication methods, different users devices, or both, in that different security characteristics correspond to different levels of trustworthiness;

an act of generating an authentication bundle representative of access to network resources by synthesizing the one or more accessed security characteristics, wherein the authentication bundle is used to grant the mobile user session one of a plurality of access levels to network resources, the granted level of access corresponding to a level of trustworthiness identified by the one or more accessed security characteristics synthesized in the authentication bundle, but wherein the mobile user session is granted a dynamically variable level of access; and in response to detecting a change in a security characteristic that reduces security of the device or the mobile user session, dynamically reducing the granted level of access to a level of access which is less than the maximium level of access associated with the user.

2. The method as recited in claim 1, wherein accessing one or more security characteristics of one or more authentication methods associated with the mobile user session comprises the following:

an act of accessing characteristics of one or more authentication methods representative of the mobile user session.

3. The method as recited in claim 1, wherein accessing one or more security characteristics of one or more authentication methods associated with the mobile user session comprises the following:

an act of accessing characteristics of a device associated with one or more of the authentication methods.

4. The method as recited in claim 3, wherein accessing characteristics of a device associated with one or more authentication methods comprises the following:

an act of accessing characteristics of a telephone associated with one or more of the authentication methods.

5. The method as recited in claim 3, wherein accessing characteristics of a device associated with one or more authentication methods comprises the following:

an act of accessing characteristics of an unknown device associated with one or more of the authentication methods.

6. The method as recited in claim 3, wherein accessing characteristics representative of a device associated with one or more authentication methods comprises the following:

an act of accessing characteristics of an known device associated with one or more of the authentication methods.

7. The method as recited in claim 6, wherein accessing characteristics of a known device associated with one or more of the authentication methods comprises the following:

an act of accessing caller line identification data associated with a device.

8. The method as recited in claim 3, wherein accessing characteristics of a device associated with one or more authentication methods comprises the following:

an act of accessing characteristics of a secure device associated with one or more of the authentication methods.

9. The method as recited in claim 3, wherein accessing characteristics of a device associated with one or more of the authentication methods comprises the following:

an act of accessing characteristics of a computing device associated with one or more of the authentication methods.

10. The method as recited in claim 9, wherein accessing characteristics of a computing device associated with one or more of the authentication methods comprises the following:

an act of accessing characteristics a personal computer associated with one or more of the authentication methods.

11. The method as recited in claim 9, wherein accessing characteristics of a computing device associated with one or more of the authentication methods comprises the following:

an act of accessing characteristics of a mobile computing device associated with one or more of the authentication methods.

12. The method as recited in claim 11, wherein accessing characteristics of a mobile computing device associated with one or more of the authentication methods comprises the following:
an act of accessing characteristics of a mobile telephone associated with one or more of the authentication methods.

13. The method as recited in claim 11, wherein accessing characteristics of a mobile computing device associated with one or more of the authentication methods comprises the following:
an act of accessing characteristics of a personal digital assistant associated with one or more of the authentication methods.

14. The method as recited in claim 11, wherein accessing characteristics of a mobile computing device associated with one or more of the authentication methods comprises the following:
an act of accessing characteristics of a hand-held computer associated with one or more of the authentication methods.

15. The method as recited in claim 1, wherein accessing one or more security characteristics of one or more authentication methods associated with the mobile user session comprises the following:
an act of accessing characteristics of a password associated with one or more of authentication methods.

16. The method as recited in claim 15, wherein accessing characteristics of a password associated with one or more authentication methods comprises the following:
an act of accessing characteristics of a personal identification number including dual tone multi-frequency tones associated with one or more of authentication methods.

17. The method as recited in claim 15, wherein accessing characteristics of a password associated with one or more authentication methods comprises the following:
an act of accessing characteristics of a personal identification number that includes spoken phrases associated with one or more of authentication methods.

18. The method as recited in claim 15, wherein accessing characteristics of a password associated with one or more authentication methods comprises the following:
an act of accessing characteristics of a password that was transmitted from a mobile computing device out of band, the password being associated with one or more authentication methods.

19. The method as recited in claim 1, wherein accessing one or more security characteristics of one or more authentication methods associated with the mobile user session comprises the following:
an act of accessing characteristics of biometric data associated with one or more authentication methods.

20. The method as recited in claim 19, wherein accessing characteristics of biometric data associated with one or more authentication methods comprises the following:
an act of accessing characteristics of a voiceprint associated with one or more authentication methods.

21. The method as recited in claim 19, wherein accessing characteristics of biometric data associated with one or more authentication methods comprises the following:
an act of accessing characteristics of a fingerprint associated with one or more authentication methods.

22. The method as recited in claim 19, wherein accessing characteristics of biometric data associated with one or more authentication methods comprises the following:
an act of accessing characteristics of a retinal scan associated with one or more authentication methods.

23. The method as recited in claim 1, wherein generating an authentication bundle representative of access to network resources by synthesizing the accessed characteristics comprises the following:
an act of generating an authentication bundle representative of access to network resources by synthesizing accessed characteristics associated with a device and accessed characteristics associated with a password.

24. The method as recited in claim 1, wherein generating an authentication bundle representative of access to network resources by synthesizing the accessed characteristics comprises the following:
an act of generating an authentication bundle representative of access to network resources by synthesizing accessed characteristics associated with a device and accessed characteristics associated with biometric data.

25. The method as recited in claim 1, wherein generating an authentication bundle representative of access to network resources by synthesizing the accessed characteristics comprises the following:
an act of generating an authentication bundle representative of access to network resources by synthesizing accessed characteristics associated with a password and accessed characteristics associated with biometric data.

26. The method as recited in claim 1, wherein generating an authentication bundle representative of access to network resources by synthesizing the accessed characteristics comprises the following:
an act of generating an authentication bundle representative of access to network resources by synthesizing accessed characteristics associated with a device, accessed characteristics associated with a password and accessed characteristics associated with biometric data.

27. The method as recited in claim 1, wherein generating an authentication bundle representative of access to network resources by synthesizing the accessed characteristics comprises the following:
an act of generating an authentication bundle representative of access to network resources by synthesizing characteristics associated with the time one or more authentication methods were executed.

28. In a computing device including an access granting module that grants a user session access to network resources based on dynamic combinations of security characteristics associated with a user session, a method for granting dynamic mobile user session access to network resources depending on one or more authentication methods and the security of one or more devices associated with the mobile user session so as to grant dynamic access that corresponds to the trustworthiness of the associated authentication methods and devices, the method comprising:
an act of accessing an authentication bundle, the authentication bundle having been generated by synthesizing one or more security characteristics of one or more authentication methods for a user device that is associated with the mobile user session the one or more security characteristics accounting for security differences in different authentication methods, different users devices, or both, in different security characteristics correspond to different levels of trustworthiness;
an act of granting one of a plurality of access levels to network resources, the granted level of access corresponding to a level of trustworthiness identified by the one or more accessed security characteristics synthesized in the authentication bundle, wherein granting one of the plurality of access levels comprises granting a mobile user session a dynamically variable level of access; and in response to detecting a change in a security characteristic that reduces security of the device or the mobile user session, dynamically reducing the granted level of access to a level of access which is less than the maximum level of access associated with the user.

29. The method as recited in claim 28, wherein accessing an authentication bundle comprises the following:

an act of the access granting module accessing an authentication bundle.

30. The method as recited in claim 28, wherein accessing an authentication bundle comprises the following:

an act of accessing an authentication bundle which causes the mobile user session to be granted access to the network resources represented by the authentication bundle.

31. The method as recited in claim 28, wherein accessing an authentication bundle comprises the following:

an act of accessing an authentication bundle which causes generation of an authorization token associated with a level of access to network resources.

32. The method as recited in claim 28, wherein accessing an authentication bundle comprises the following:

an act of accessing an authentication bundle which causes generation of an authorization token that includes data representative of one or more authentication methods associated with the mobile user session.

33. The method as recited in claim 28, wherein granting a mobile user session less than the maximum level of access associated with a user comprises the following:

an act of receiving an authentication bundle, which causes a filter to reduce the mobile user session's access to network resources to less than the maximum level of access associated with a user.

34. The method as recited in claim 28, wherein granting a mobile user session less than the maximum level of access associated with a user comprises the following:

an act of receiving an authentication bundle, which causes a reverse proxy to reduce the mobile user session's access to network resources to less than the maximum level of access associated with a user.

35. The method as recited in claim 28, wherein granting one of a plurality of access levels to network resources comprises the following:

an act of modifying a mobile user session's existing access to network resources, the modified access being different than the existing access.

36. The method as in claim 35 wherein modifying a mobile user session's existing access to network resources, the modified access being different than the existing access comprises the following:

an act of modifying a mobile user session's existing access to network resources by granting access to network resources in addition to the existing access.

37. The method as in claim 35 wherein modifying a mobile user session's existing access to network resources, the modified updated access being different than the existing access comprises the following:

an act of modifying a mobile user session's access to network resources by revoking some of the existing access to network resource.

38. The method as recited in claim 28, further comprising:

an act of notifying a user associated with the mobile user session what network resources the mobile user session may access.

39. A computer program product for implementing, in a computing device including a security module that grants a user session access to network resources based on dynamic combinations of security characteristics associated with a user session, a method for granting dynamic mobile user session access to network resources depending on one or more authentication methods and the security of one or more devices so as to grant access that corresponds to the trustworthiness of the associated authentication methods and devices, the computer program product comprising:

a computer-readable medium carrying computer-executable instructions, that when executed at the computing device, cause the computing device to perform the method recited in claim 1.

40. The computer program product as recited claim 39, wherein the computer-readable medium is a physical storage media.

41. A computer program product for implementing, in a computing device including a security module that grants a user session access to network resources based on dynamic combinations of security characteristics associated with a user session, a method for granting dynamic mobile user session access to network resources depending on one or more authentication methods and the security of one or more devices so as to grant access that corresponds to the trustworthiness of the associated authentication methods and devices, the computer program product comprising:

a computer-readable medium carrying computer-executable instructions, that when executed at the computing device, cause the computing device to perform the method, recited in claim 28.

42. The computer program product as recited claim 41, wherein the computer-readable medium is a physical storage media.

43. A method as recited in claim 1, wherein the method includes detecting a change in one of the security characteristics comprising a transition of the device to a less secure device.

44. A method as recited in claim 1, wherein the method includes detecting a change in one of the security characteristics comprises a change in availability of authentication methods.

45. A method as recited in claim 1, wherein the method includes detecting a change in one of the security characteristics comprising a change is a configuration of the device.

46. A method as recited in claim 1, wherein the method includes detecting a change in one of the security characteristics comprising a change in a physical condition of a user.

47. A method as recited in claim 1, wherein the method includes detecting a change in one of the security characteristics comprising a deterioration of a voice connection.

* * * * *